United States Patent Office.

DANIEL SPILL, OF PARADISE TERRACE, HACKNEY, ENGLAND.

Letters Patent No. 91,377, dated June 15, 1869.

IMPROVEMENT IN COMPOUNDS CONTAINING XYLOIDINE.

The Schedule referred to in these Letters Patent and making part of the same.

*To whom it may concern:*

Be it known that I, DANIEL SPILL, of Paradise Terrace, Hackney, in the county of Middlesex, England, have invented certain new and useful Improvements in the Production of Compounds Containing Xyloidine; and I hereby declare the following to be a full, clear, and exact description of the same.

This invention relates to the production of materials or compounds containing xyloidine; and consists in the admixture of xyloidine (or that product which results from the action of a mixture of sulphuric and nitric acids upon ligneous or vegetable fibre) with animal, fish, vegetable, or mineral oils, oxidized or otherwise, such, for example, as vegetable or mineral tar, lard-oil, cod-liver oil, linseed-oil, or heavy coal-oils, or with mixtures of the same, together with the admixture of other ingredients, such as paraffine, camphor, resins, fat, wax, India rubber, gutta-percha or balata-gum, or mixtures of the same, so as to produce a material or materials which may be employed either alone or in conjunction with pigments, or other inert bodies, for the production of a compound which may be applied for useful purposes in the arts; such as for moulding into forms, or for rolling into sheets, or otherwise; for spreading either upon or between fabrics, or otherwise; or for the coating of metals and wood.

In carrying out my invention, I prefer first to dissolve in one or more of the before-mentioned oils one or more of the ingredients previously mentioned, such, for example, as camphor. This I prefer to effect at an elevated temperature.

The solution thus resulting is a solvent of xyloidine, and I employ it for the purpose of dissolving the xyloidine.

The xyloidine is, by preference, previously dried or deprived, by any of the well-known methods, of any adhering moisture, and then the incorporation with, or the solution in the before-mentioned solvent may be effected at the ordinary or at an elevated temperature.

The mixture or compound thus resulting is then masticated, either by the employment of rolls or masticators, such as are employed in the preparation of gutta-percha or India-rubber, or otherwise, by preference with the application of heat, as is well understood.

The product thus obtained may either be employed direct, or it may be further incorporated with pigments, or with metallic, mineral, vegetable, or fibrous materials, as diluents.

The consistency of the material will be dependent on the proportions of the several ingredients employed; thus, for example, when I wish to obtain a material suitable for the covering or protecting of telegraph-wires, or for moulding, rolling, or spreading, I have found that the several materials employed in about the following proportions, *videlicit*, camphor, eighteen parts by weight; oil, such, for example, as castor or linseed-oil, oxidized, boiled, or otherwise, forty-four parts by weight; xyloidine, soluble, thirty-eight parts by weight, will give good results; but these proportions, and the several ingredients will vary according to the purposes to which it is intended the materials shall be applied.

When it is desired to obtain a material which shall possess greater or less flexibility, or greater or less fluidity, then I increase or decrease the proportion or character of oil or oils until the desired properties are obtained.

When it is desired to obtain a material which shall possess greater or less flexibility, or greater or less fluidity, then I increase or decrease the proportion or character of oil or oils until the desired properties are obtained.

When it is desired to produce a material of which gutta-percha shall form one of the ingredients, the gutta-percha may be first subjected to the solvent action of the ingredients to be employed, as hereinbefore mentioned, or the gutta-percha may be softened by heat, and then be incorporated with the other ingredients.

What I wish to secure as my invention, is—

The manufacture and production of compounds containing xyloidine, in conjunction with oils, camphor, paraffine, and gutta-percha, or other similar substances, by the employment of non-volatile solvents, such solvents becoming and remaining a part of the resulting compound.

In testimony whereof, I have signed my name to this specification, in the presence of two subscribing witnesses.

DANIEL SPILL.

Witnesses:
   THOMAS I. BYRNE,
      47 *Lincoln's Inn Fields,*
   RUDOLPH CHAS. NICKOL,
      10 *Birchin Lane, London.*